US008200935B2

(12) United States Patent
Noguchi et al.

(10) Patent No.: US 8,200,935 B2
(45) Date of Patent: Jun. 12, 2012

(54) STORAGE CAPACITY ALLOCATION CONTROL APPARATUS AND METHOD THEREOF

(75) Inventors: Yasuo Noguchi, Kawasaki (JP); Kazutaka Ogihara, Kawasaki (JP); Masahisa Tamura, Kawasaki (JP); Yoshihiro Tsuchiya, Kawasaki (JP); Tetsutaro Maruyama, Kawasaki (JP); Takashi Watanabe, Kawasaki (JP); Tatsuo Kumano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 560 days.

(21) Appl. No.: 12/399,505

(22) Filed: Mar. 6, 2009

(65) Prior Publication Data
US 2009/0248995 A1 Oct. 1, 2009

(30) Foreign Application Priority Data

Mar. 26, 2008 (JP) .................................. 2008-81734

(51) Int. Cl.
*G06F 13/00* (2006.01)
(52) U.S. Cl. .................... 711/170; 711/151; 711/163
(58) Field of Classification Search .................. 711/151, 711/163, 170
See application file for complete search history.

(56) References Cited

U.S. PATENT DOCUMENTS

| 5,758,050 A * | 5/1998 | Brady et al. ..................... 714/1 |
| 6,879,266 B1 * | 4/2005 | Dye et al. ........................ 341/51 |
| 7,082,500 B2 * | 7/2006 | Scott et al. ..................... 711/141 |
| 2005/0235109 A1 | 10/2005 | Ogihara et al. |
| 2007/0101083 A1 | 5/2007 | Ogihara et al. |
| 2007/0261059 A1 * | 11/2007 | Orth et al. ..................... 719/312 |

FOREIGN PATENT DOCUMENTS

| JP | A 9-311810 | 12/1997 |
| JP | A 2007-122463 | 5/2007 |
| WO | WO 2004/104845 A1 | 2/2004 |

* cited by examiner

*Primary Examiner* — Reba I Elmore
(74) *Attorney, Agent, or Firm* — Greer, Burns & Crain, Ltd.

(57) ABSTRACT

An allocation control apparatus may access an address table storing addresses of slice areas allocated in a storage area for an entire storage system having a plurality of storage devices and addresses that do not correspond to allocated slice areas. The allocation control apparatus includes a reception unit receiving a request for allocating an arbitrary storage capacity an allocation unit allocating, by referring to the address table, an address that does not correspond to the allocated slice area for at least a part of the requested storage capacity and allocates an address for the slice area to the remaining storage capacity when the reception unit receives the allocation request, and a transmission unit transmitting the result allocated by the allocation unit to a requesting source of the allocation request.

6 Claims, 13 Drawing Sheets

FIG. 6

| SLICE ID | VIRTUAL FLAG | ALLOCATION FLAG | ADDRESS | VIRTUAL DISK ID | VIRTUAL DISK ADDRESS | |
|---|---|---|---|---|---|---|
| Si-1 | OFF | ON | ADDRi-1 | VD1 | VD1-ADp | } Mi-1 |
| Si-2 | OFF | OFF | ADDRi-2 | null | null | |
| ... | ... | ... | ... | ... | ... | |
| Si-x | OFF | OFF | ADDRi-x | null | null | |
| Si-(x+1) | ON | ON | null | VD1 | VD1-ADr | } Mi-(x+1) |
| ... | ... | ... | ... | ... | ... | |
| Si-(y-1) | ON | OFF | null | null | null | |
| Si-y | ON | OFF | null | null | null | } Mi-y |

BEFORE CHANGE

710

| SLICE ID | DISK NODE ID | VIRTUAL FLAG | ALLOCATION FLAG | ADDRESS | VIRTUAL DISK ID | VIRTUAL DISK ADDRESS | DISK NODE ADDRESS | |
|---|---|---|---|---|---|---|---|---|
| Si-(x+1) | 102-i | ON | ON | null | VD1 | VD1-ADr | ADDRi | ⎫ Mi-(x+1) |
| Si-2 | 102-i | OFF | OFF | ADDRi-2 | null | null | ADDRi | ⎬ Mi-2 |

FIG. 7B

AFTER CHANGE

720

| SLICE ID | DISK NODE ID | VIRTUAL FLAG | ALLOCATION FLAG | ADDRESS | VIRTUAL DISK ID | VIRTUAL DISK ADDRESS | DISK NODE ADDRESS | |
|---|---|---|---|---|---|---|---|---|
| Si-(x+1) | 102-i | ON | OFF | null | null | null | ADDRi | ⎫ Mi-(x+1) |
| Si-2 | 102-i | OFF | ON | ADDRi-2 | VD1 | VD1-ADr | ADDRi | ⎬ Mi-2 |

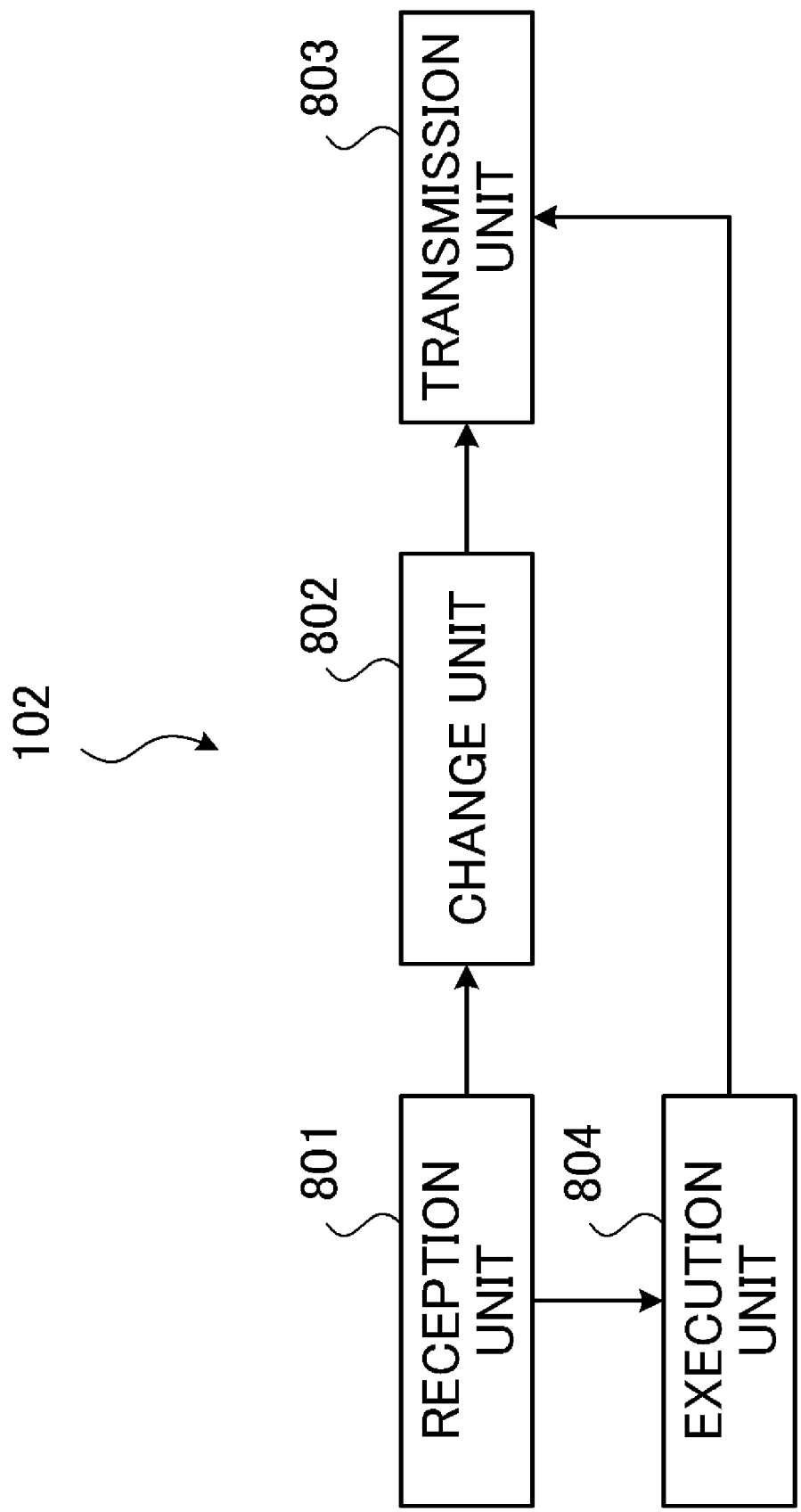

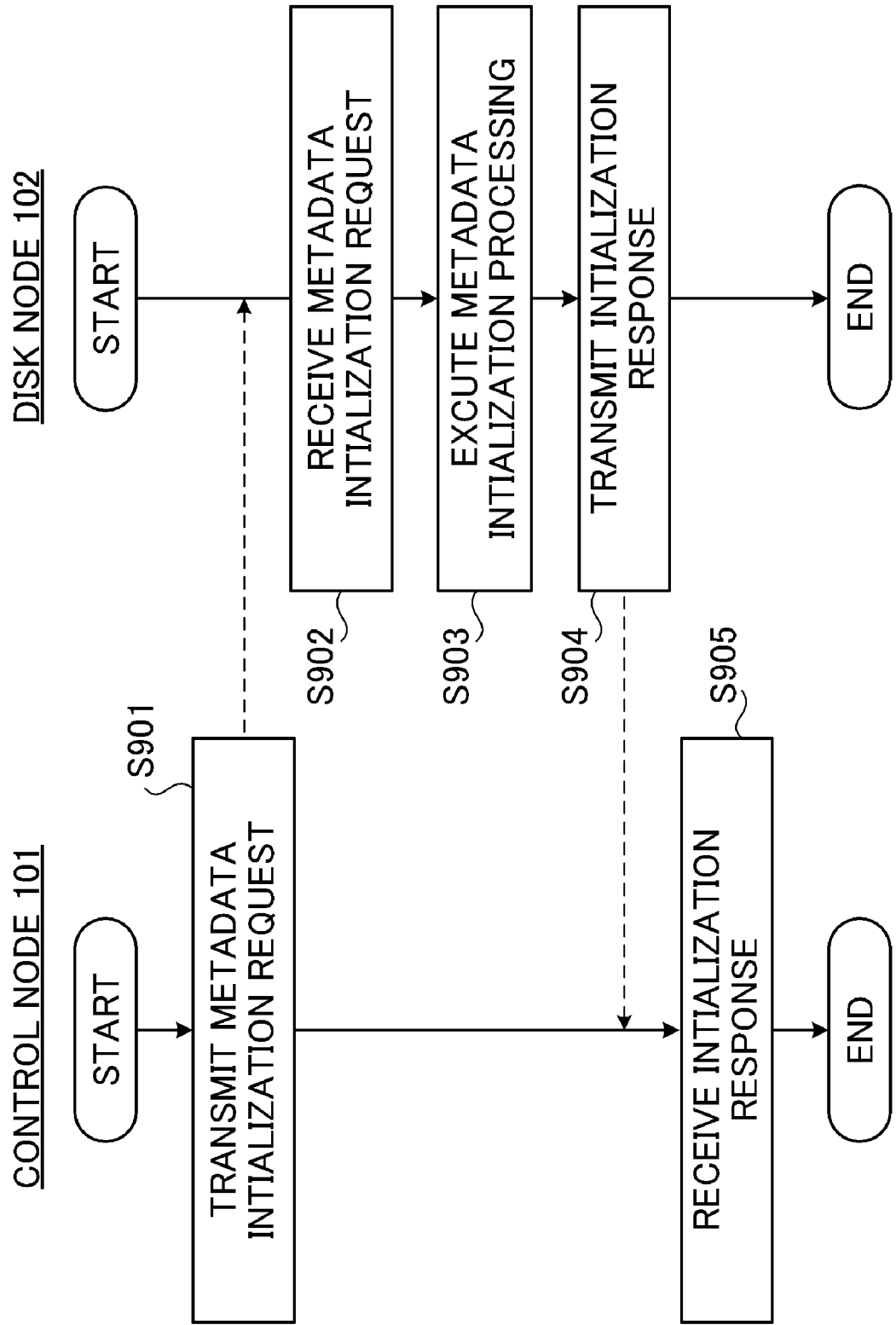

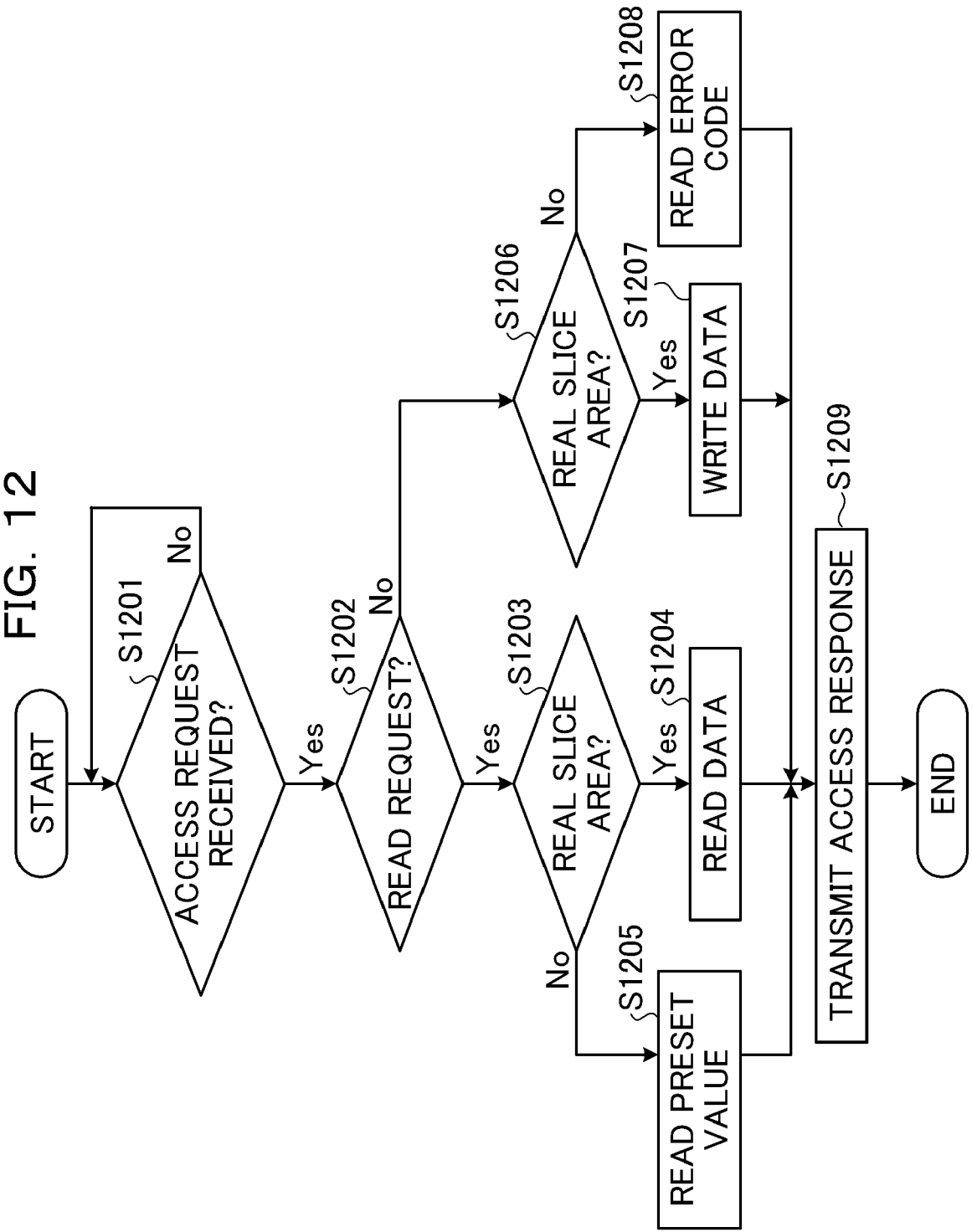

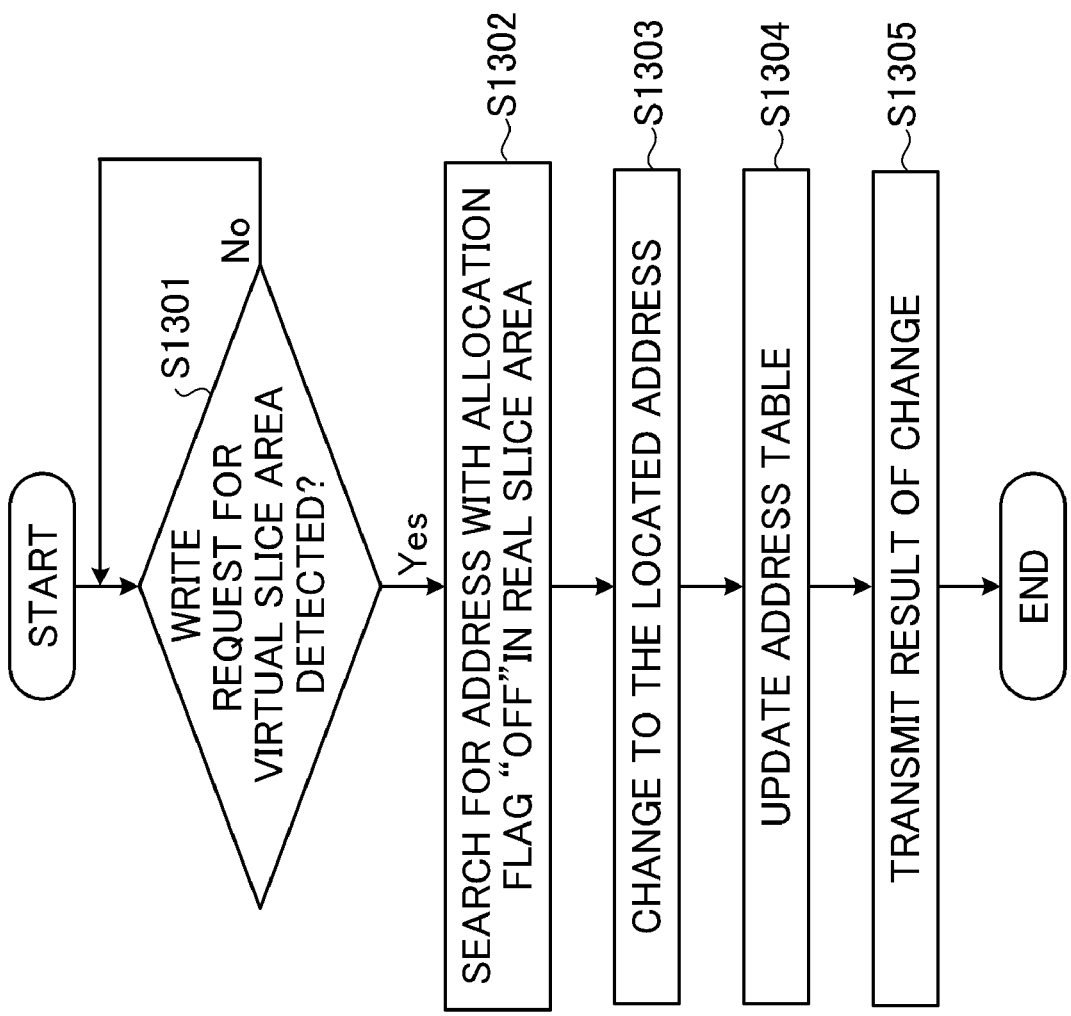

US 8,200,935 B2

STORAGE CAPACITY ALLOCATION CONTROL APPARATUS AND METHOD THEREOF

CROSS-REFERENCE TO RELATED APPLICATIONS

This application is based upon and claims the benefit of priority from the prior Japanese Patent Application No. 2008-81734 filed on Mar. 26, 2008, the entire contents of which are incorporated herein by reference.

BACKGROUND

1. Field

The present embodiments relate to an allocation control apparatus for controlling an allocation of storage capacity of an entire storage system that has a plurality of storage devices and a method thereof.

2. Description of the Related Art

Conventionally a technique has been put to practical use that pools capacity of disks in a storage device, and creates and provides a logical disk based on a client request. A characteristic of the technique includes a provisioning. The provisioning is a function that does not allocate all of storage capacity to a disk (virtual disk) when creation of a logical disk is requested, but allocates storage capacity when a client accesses the disk.

The technique allows creating a logical disk that exceeds a capacity of a disk pool or more. If the remaining capacity of a disk pool decreases as a result of increase in allocation of storage capacity in response to accesses from clients, the disk pool may be extended by connecting a new disk.

In order to achieve a provisioning function, a storage device needs to have the following functions in addition to a function to perform accesses; a function to manage a logical capacity of a logical disk and to manage allocated storage capacity a function to allocate a disk pool to the logical disk at a timing when a client accesses, and a function to notify an available capacity of the disk pool.

A storage device that supports conventional provisioning is configured in which a single control apparatus connects clients and a disk pool, and the control apparatus provides the above functions. Thus, there are drawbacks in that the numbers of clients and disks that can be connected to the single control apparatus are limited, thus the scalability is limited.

Under these circumstances, a multi-node system with high scalability has been put to practical use in order to build a large scale virtual storage system (for example, Japanese Laid-open Patent Publication No. H. 9-311810, International Publication 2004/104845, Japanese Laid-open Patent Publication No. 2007-122463). The multi-node system is configured by connecting a plurality of disk nodes that include general purpose disk devices and servers via a network.

SUMMARY

According to an aspect of the present invention, an allocation control apparatus includes a reception unit receiving a request for allocating an arbitrary storage capacity an allocation unit allocating, by referring to an address table, an address that does not correspond to the slice area for at least a part of the requested storage capacity and allocates an address for the slice area to the remaining storage capacity when the reception unit receives the allocation request, and a transmission unit transmitting the result allocated by the allocation unit to a requesting source of the allocation request.

Additional objects and advantages of the invention will be set forth in part in the description which follows, and in part will be obvious from the description, or may be learned by practice of the invention. The object and advantageous of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 6 is an explanatory diagram illustrating a specific example of a request for changing metadata;

FIGS. 7A-7B are explanatory diagrams illustrating metadata before and after a change;

FIG. 8 is a block diagram illustrating a functional configuration of a disk node;

FIG. 9 is a sequence diagram illustrating processing procedures of initializing metadata;

FIG. 12 is a flowchart illustrating processing procedures of an access request at a disk node; and FIG. 13 is a flowchart illustrating change processing procedures at a control node.

DETAILED DESCRIPTION OF THE PREFERRED EMBODIMENTS

According to the above conventional technique, a provisioning in a multi-nodes storage system is achieved by providing a provisioning function to a disk device in a disk node. However, there is a drawback that an optimum allocation may not be achieved among a plurality of disk nodes as a whole because a disk node that is accessed allocates a disk pool independently.

More specifically a disk pool is consumed by each disk node; the disk pool is required to be extended by adding a disk individually when available capacity of the disk pool decreases. Thus the disk pool needs to be extended when the disk pool is disproportionately consumed by a specific disk node, even if there is an available capacity as an entire system. In view of the above drawbacks, the inventors invented an allocation control apparatus and a method thereof that allow efficient and effective capacity allocation by collectively controlling allocation status of storage capacity of an entire storage system.

Now, an embodiment of allocation control apparatus and allocation control method will be explained by referring to accompanying drawings. Note that, in this description, an allocation control apparatus means a control node and an allocation control program is a program installed in the allocation control apparatus.

(System Configuration of Storage System)

Figure 1:
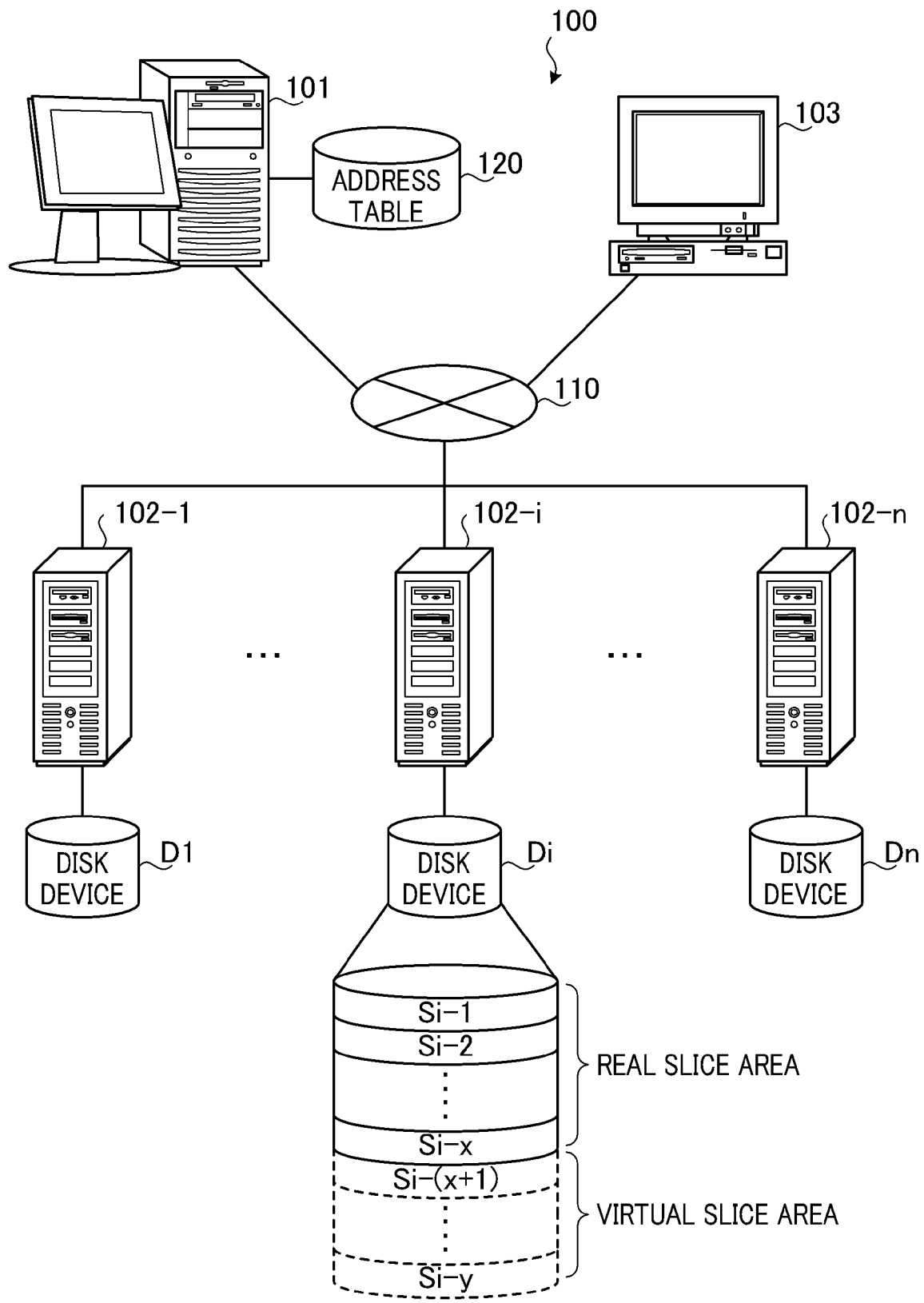
FIG. 1 is a system configuration diagram of a storage system.

First, a system configuration of a storage system 100 of an embodiment will be described. FIG. 1 is a system configuration diagram of a storage system. In FIG. 1, the storage system 100 includes a control node 101, disk nodes 102-1 to 102-*n*, and a client node 103 that may be accessed each other via a network 110 such as the Internet, Local Area Network (LAN), and Wide Area Network (WAN).

The control node 101 is a computer apparatus that allocates storage capacity of the entire storage system 100 to a virtual disk for requested storage capacity. The control node 101 may access an address table 120 that manages addresses in the storage area of the entire storage system 100. The address table 120 may be provided to the control node 101 or to an external apparatus not shown in the drawings.

The disk nodes 102-1 to 102-*n* are computer apparatuses with disk devices D1 to Dn that have a magnetic disk or an optical disk, and process reading and writing data in response to an access request from a client node 103. Storage capacity of each of disk devices D1 to Dn may not be necessarily the same and may be varied for each of the disk devices.

The client node 103 is a computer apparatus used by a user who requests an allocation. The client node 103 performs an access request such as writing and reading data to and from the storage system 100. In FIG. 1, for simplification, only the client node 103 is represented.

A data structure of a disk device Di will be described by using a disk node 102-*i* as an example. According to this embodiment, a storage area of the disk device Di is segmented into a plurality of small areas (real slice areas "Si-1" to "Si-x") by dividing the entire storage area of the disk device Di in units of slices.

It is assumed that the disk device Di provides a virtual storage area in which no physical storage area exists (a storage area indicated by dotted lines in FIG. 1). Moreover, it is assumed that the virtual storage area of the disk device Di is segmented into a plurality of small areas (virtual slice areas "Si-(x+1)" to "Si-y") by dividing the virtual storage area in units of slices.

Metadata for identifying the status of allocation to the virtual disks is assigned to these real slice areas "Si-1" to "Si-x", and virtual slice areas "Si-(x+1)" to "Si-y", and the metadata is managed by the disk node 102-*i*. The details will be described later. The content of metadata is changed in response to a change request from the control node 101.

Metadata for each of the slice areas (virtual slice areas and real slice areas) of the entire storage system 100 is collectively managed by the control node 101. Upon completion of allocation to the virtual disk, metadata for slice areas allocated to the virtual disk (result of allocation) is transmitted from the control node 101 to the client node 103.

The client node 103 performs an access request to the storage system 100 by referring to the allocation result transmitted from the control node 101. More specifically by specifying an address on the virtual disk, the client node 103 performs requests for writing and reading to and from the storage system 100.

According to this embodiment, the storage capacity of each slice area obtained by dividing the storage area of the entire storage system (for example, real slice areas "Si-1" to "Si-x", and virtual slice areas "Si-(x+1)" to "Si-y") is assumed to be uniform. However, the storage capacity is not necessarily uniform; the storage capacity in units of slices may be determined for each of disk nodes 102-1 to 102-*n* and storage areas of each of disk devices D1 to Dn may be divided into a plurality of slice areas based on the determined storage capacity.

(Data Structure of Address Table)

Figure 2:
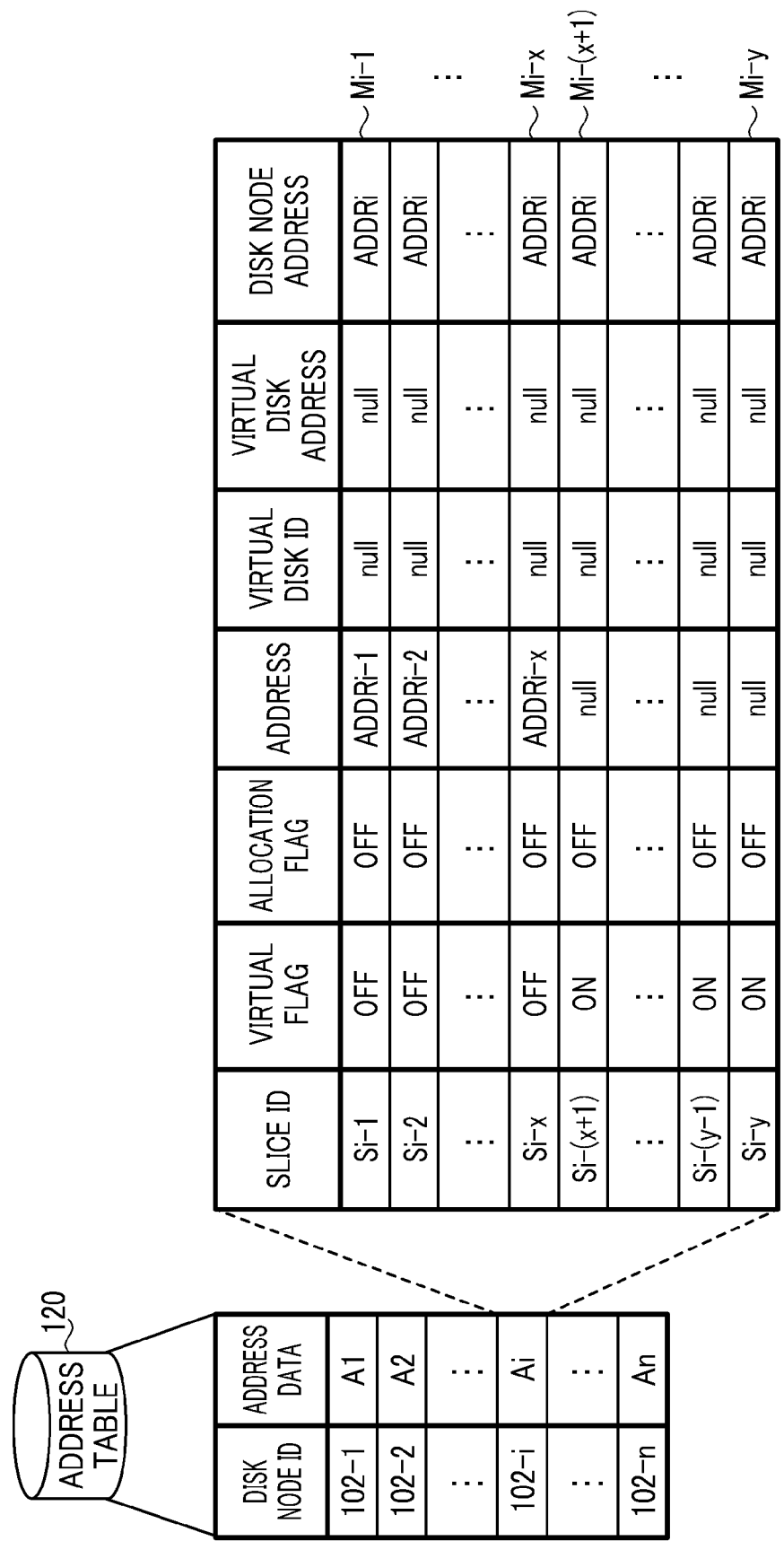
FIG. 2 is an explanatory diagram illustrating a data structure of an address table.

Now, a data structure of an address table 120 that may be accessed from a control node 101 will be described. FIG. 2 is an explanatory diagram illustrating a data structure of an address table. In FIG. 2, the address table 120 stores address data "A1" to "An" for each of the disk nodes 102-1 to 102-*n* in a storage system 100.

More specifically address data "A1" to "An" include metadata that is assigned to real slice areas and virtual slice areas of each of the disk nodes 102-1 to 102-*n*. For example, the address data "A1" includes metadata "Mi-1" to "Mi-x" for each of real slice areas "Si-1" to "Si-x" and metadata "Mi-(x+1)" to "Mi-y" for each of virtual slice areas "Si-(x+1)" to "Si-y".

For each of the slice areas (real slice areas or virtual slice areas), each of metadata "Mi-1" to "Mi-y" has a slice ID, a virtual flag, an allocation flag, an address, a virtual disk ID, a virtual disk address, and a disk node address. The slice ID is an identifier for identifying each slice area.

The virtual flag is a flag for identifying whether it is a virtual slice area or not. If it is a real slice area, the flag is "OFF", and if it is a virtual slice area, the flag is "ON". An allocation flag is a flag for identifying whether the slice area is allocated to a virtual disk or not. If the slice area has already been allocated to the virtual disk, the flag is "ON", while if it has not been allocated yet, the flag is "OFF".

An address is for identifying a place where a real slice area is. No physical storage area that corresponds to a virtual slice area exists, thus the address of the virtual slice is "null". A virtual disk ID is for identifying a target virtual disk for allocation. The virtual disk address is an address on a virtual disk. Disk node addresses are addresses of disk nodes 102-1 to 102-*n* (for example, IP addresses of disk nodes 102-1 to 102-*n*).

A stored content of an address table 120 shown in FIG. 2 shows an initial state. When the address table 120 is provided in a control node 101, the functions of the address table 120 are achieved by a storage unit such as a hard disk 305 or an optical disk 307 shown in FIG. 3. In this case, it is assumed that an address of a real slice area is allocated upon initialization of the address table 120, but it is not limited to this. For example, an address of a real slice area may be allocated to storage areas of each of disk nodes 102-1 to 102-*n*, when a real slice area is allocated to a virtual disk.

(Hardware Configuration of a Computer Apparatus)

Figure 3:
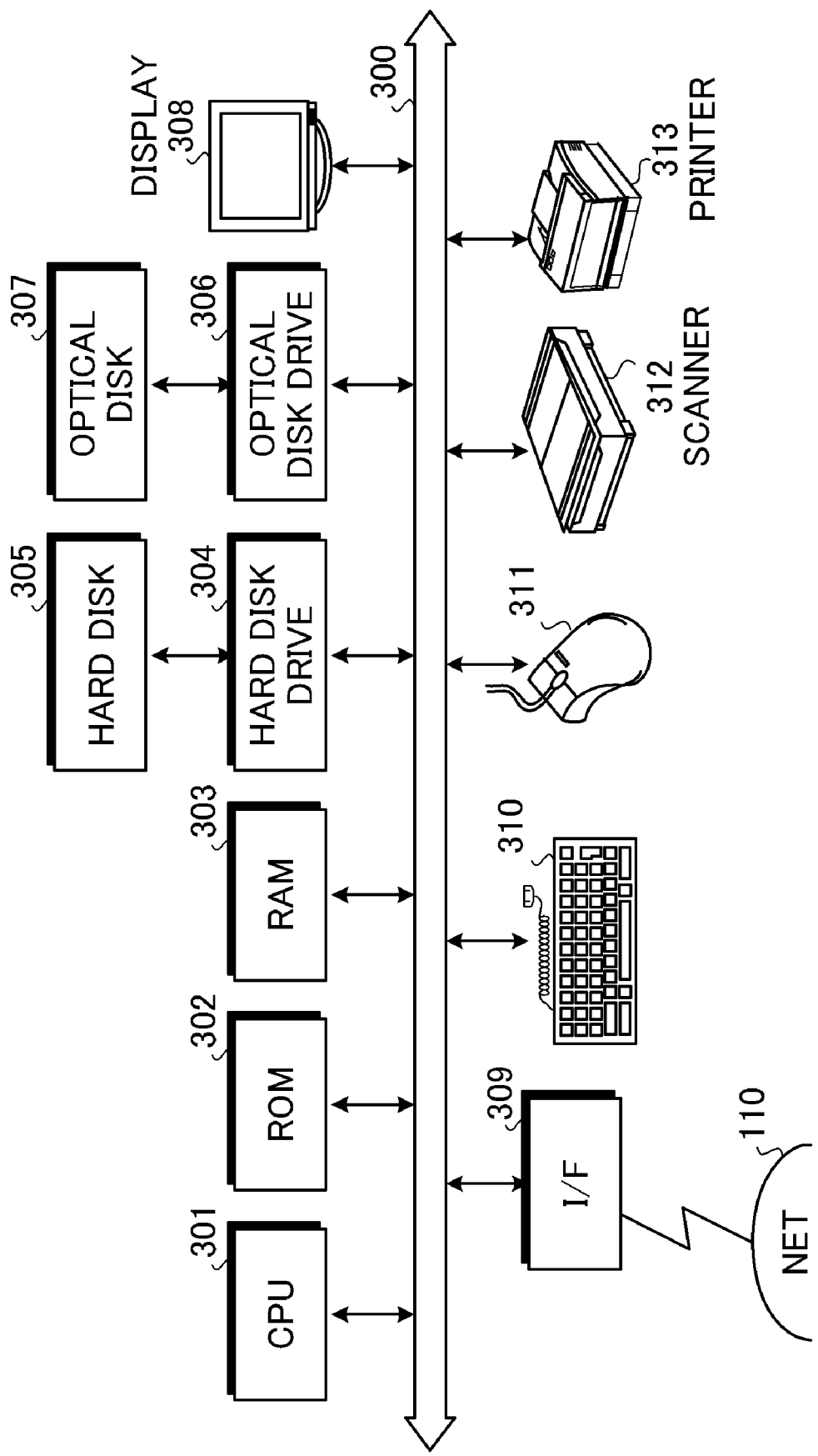
FIG. 3 is a block diagram illustrating a hardware configuration of a computer apparatus.

Now, a hardware configuration of a computer apparatus (a control node 101, a disk node 102-1 to 102-*n*) shown in FIG. 1 will be described. FIG. 3 is a block diagram illustrating a hardware configuration of a computer apparatus.

In FIG. 3, a computer apparatus provides a central processing unit (CPU) 301, a read only memory (ROM) 302, a random access memory (RAM) 303, a hard disk drive 304, a hard disk 305, an optical disk drive 306, an optical disk 307, a display 308, an interface (I/F) 309, a keyboard 310, a mouse 311, a scanner 312, and a printer 313. Each of components is connected by a bus 300.

The CPU 301 controls the entire computer apparatus. The ROM 302 stores a program such as a boot program. The RAM 303 is used as a work area of the CPU 301. The hard disk drive 304 controls reading and writing data to and from the hard disk 305 according to the control by the CPU 301. The hard disk 305 stores data written by control of the hard disk drive 304.

The optical disk drive 306 controls reading and writing data to and from the optical disk 307 according to the control by the CPU 301. The optical disk 307 performs processing such as storing data written by a control of the optical disk drive 306, and causing a computer to read data stored in the optical disk 307.

The optical disk 307 may be a compact disk (CD), a digital versatile disk (DVD), a magneto optical (MO), or a memory card. The display 308 displays a cursor, an icon, and a toolbox and data such as a document, an image, and functional information. For the display 308, a cathode ray tube (CRT), a thin film transistor (TFT), a liquid crystal display and a plasma display may be used.

The I/F 309 is connected to a network 110 such as the Internet via a communication network and connected to other devices via this network 110. The I/F 309 controls an interface between the network 110 and the internal devices of the computer apparatus, and that controls input and output of data to and from external devices. The I/F 309 may be a modem or a LAN adaptor.

The keyboard 310 provides keys for inputting characters, numbers and various instructions and through which data is input. The keyboard 310 may be an input pad with touch panel method or ten-keys. A mouse 311 moves a cursor, selects an area, or moves a window, and changes the size of a window. As the mouse 311, a track ball or a joy stock may be used as long as it provides functions for a pointing device.

A scanner 312 optically reads an image and stores the image data in a computer device. The scanner 312 may have a function of an optical character reader (OCR). The printer 313 prints image data and document data. As the printer 313, for example, a laser printer and an ink jet printer may be used.

(Functional Configuration of Storage System)

Figure 4:
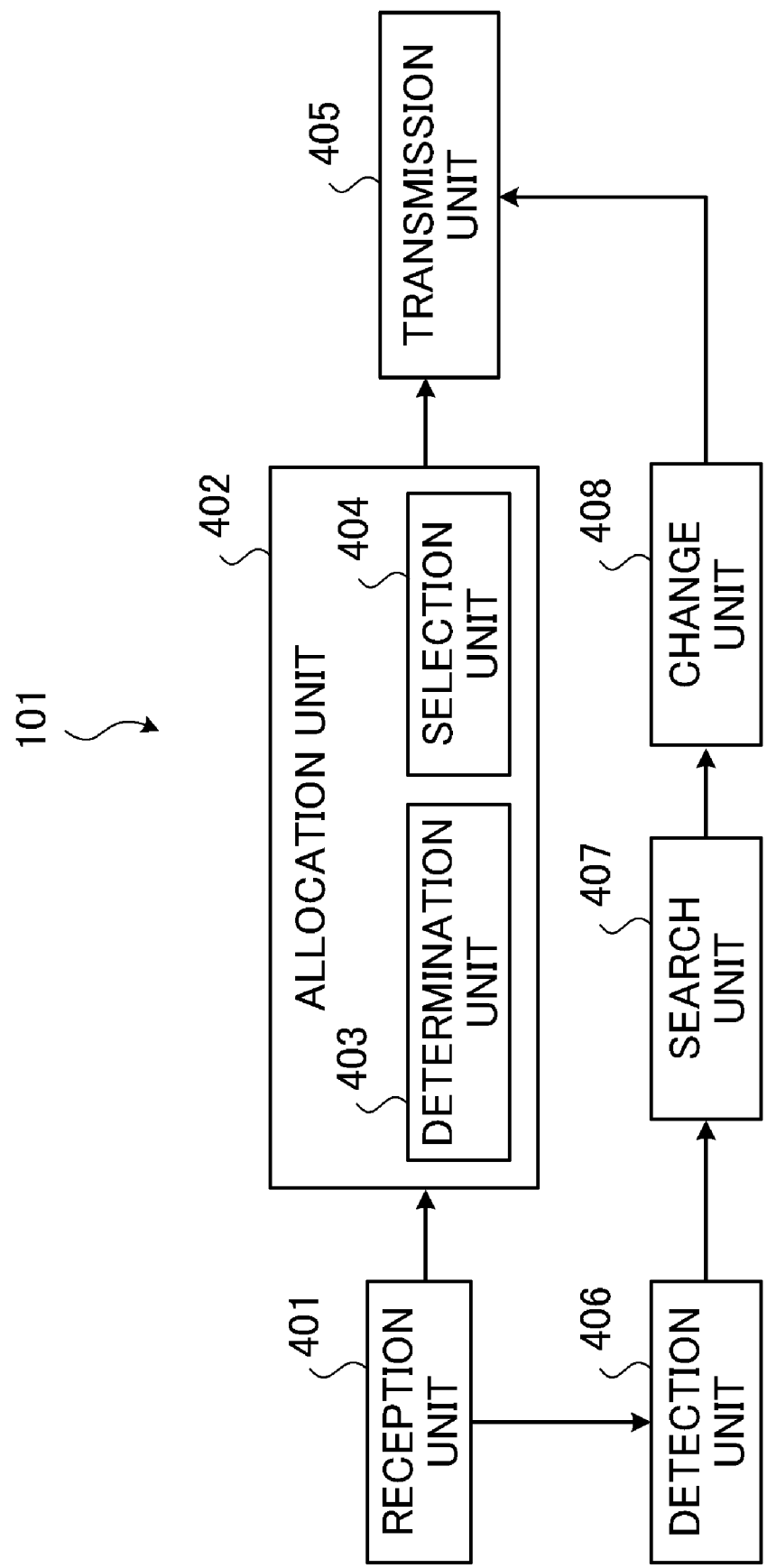
FIG. 4 is a block diagram illustrating a functional configuration of a control node.

Now, a functional configuration of a storage system 100 will be described. First, a functional configuration of a control node 101 will be described. FIG. 4 is a block diagram illustrating the functional configuration of a control node. In FIG. 4, the control node 101 includes a reception unit 401, an allocation unit 402, a determination unit 403, a selection unit 404, a transmission unit 405, a detection unit 406, a search unit 407, and a change unit 408.

Each of the functions 401 to 408 are achieved by causing a computer to execute programs for relevant functions 401 to 408 stored in a storage unit such as a ROM 302, a RAM 303, a hard disk 305 or an optical disk 307 of a control node 101 or by an input/output I/F. Output data from each of functions 401 to 408 is stored in the storage unit. A connected function to where an arrow points in FIG. 4, reads output data from a connecting function from where an arrow starts in FIG. 4, and causes a CPU to execute a program of the relevant function.

First, the reception unit 401 receives a request for allocating an arbitrary storage capacity. More specifically the allocation request is a request for creating a disk with an arbitrary storage capacity (for example, 1 GB). The disk is a virtual disk to which not all of the requested storage capacity is allocated when it is created. The allocation request may be directly received from a client node 103 (refer to FIG. 1), or from an external device used by an operator of a storage system 100.

When the reception unit 401 receives an allocation request, an allocation unit 402 refers to an address table 120 and allocates an address that does not correspond to a slice area for at least a part of the requested storage capacity and allocates an address for a slice area for the remaining capacity Specific processing of allocations by the allocation unit will be described. Hereunder, it is assumed that a requested storage capacity is 1 GB, and a storage capacity of a virtual slice area and a real slice area that each of disk nodes 102-1 to 102-n has are 1 MB respectively.

First, a new virtual disk ID that corresponds to a requesting client is assigned to a virtual disk to which the requested storage capacity is to be allocated. As a result, the correspondence relationship between the requesting client and the virtual disk may be recognized. Hereunder, as an example, a virtual disk VD1 to which a virtual disk ID "VD1" is assigned will be described.

A determination unit 403 determines the number of slices that comprise a virtual disk VD1, in other words, the number of slice areas that are to be assigned to the virtual disk VD 1. More specifically, the number of slices is determined by dividing the requested storage capacity, 1 GB by a storage capacity of each slice area, 1 MB. In this case, the number of slices that comprises a virtual disk VD1 is determined to be "1000".

After that, the determination unit 403 determines the number of slices for a virtual slice area and that for a real slice area among the 1000 slices that comprise the virtual disk VD1. More specifically the number of slices for the virtual slice area and that for the real slice area are determined, for example, based on a predetermined ratio of a virtual slice area and a real slice area.

If the above ratio is "virtual slice area:real slice area=1:1", the determination unit 403 determines the number of slices for the virtual slice as "500" and that for the real slice area as "500."

If the storage capacity of a virtual slice area and that of a real slice area differ depending on each of disk nodes 102-1 to 102-n, the number of slices that comprise a virtual disk, the number of slices for a virtual slice area and those for a real slice area are determined by using a storage capacity for each of the disk nodes.

Then, a selection unit 404 refers to an address table 120 and selects a virtual slice area from virtual slice areas with an allocation flag "OFF". Then, the allocation unit 402 allocates the virtual slice area selected by the selection unit 404 to the virtual disk VD 1.

More specifically for example, when the selection unit 404 selects a virtual slice area "Si-(x+1)" of a disk node 102-i, the virtual slice area "Si-(x+1)" is allocated to a virtual disk VD 1. Moreover, every time the allocation unit 402 allocates a slice area to a virtual disk, a stored content of an address table 120 is updated.

Here, an allocation flag for metadata "Mi-(x+1)" of the virtual slice area "Si-(x+1)" is changed from "OFF" to "ON", the virtual disk ID is changed from "null" to "VD1", and the virtual disk address is changed from "null" to "VD1-ADr" respectively. Note that the virtual disk address "VD1-ADr" indicates that the address is "r" th address from the beginning of addresses on the virtual disk VD1.

The selection unit 404 repeats selection of a virtual slice area until the number of allocations performed by the allocation unit 402 reaches the number of slices for a virtual slice area determined by the determination unit 403. At this time, slices for a virtual slice area may be selected so that the number of selected slices becomes equal among each of disk nodes 102-1 to 102-n.

For example, virtual slice areas are selected one by one from virtual slice areas of each of the disk nodes 102-1 to 102-n, and those are allocated to the virtual disk VD1. After selecting virtual slice areas from all of the disk nodes 102-1 to 102-n, if the selected slices have not reached to the number of slices determined by the determination unit 403, virtual slice areas are further selected from virtual slice areas in each of disk nodes 102-1 to 102-n.

This allows allocating virtual slice areas in the disk nodes 102-1 to 102-n to the virtual disk VD1 evenly. As a result, processing of write and read requests for virtual slice areas are evenly distributed among disk nodes 102-1 to 102-n.

Moreover, the selection unit 404 refers to the address table 120 and selects a real slice area from real slice areas with an allocation flag "OFF". Then, the allocation unit 402 allocates the real slice area selected by the selection unit 404 to the virtual disk VD1.

More specifically for example, when the selection unit 404 selects a real slice area "Si-1" in the disk node 102-i, the real slice area "Si-1" is allocated to the virtual disk VD1. As described above, every time the allocation unit 402 allocates a slice area to a virtual disk, the stored content of the address table 120 is updated.

Here, an allocation flag for metadata "Mi-1" of the real slice area "Si-1" is changed from "OFF" to "ON", a virtual disk ID is changed from "null" to "VD1", and a virtual disk address is changed from "null" to "VD1-ADp" respectively. Note that the virtual disk address "VD1-ADp" indicates that the address is "p" th address from the beginning of addresses on the virtual disk VD1.

The selection unit 404 repeats selection of a real slice area until the number of allocations performed by the allocation unit 402 reaches the number of slices for a real slice area determined by the determination unit 403. At this time, slices for a real slice area may be selected so that the number of selected slices becomes equal among each of the disk nodes 102-1 to 102-n.

For example, real slice areas are selected one by one from real slice areas of each of the disk nodes 102-1 to 102-n, and those are allocated to the virtual disk VD1. After selecting real slice areas from all of the disk nodes 102-1 to 102-n, if the selected slices have not reached the number of slices determined by the determination unit 403, real slice areas are further selected from real slice areas in each of disk nodes 102-1 to 102-n.

This allows allocating real slice areas in the disk nodes 102-1 to 102-n to the virtual disk VD1 evenly. As a result, processing of write and read requests for real slice areas are evenly distributed among disk nodes 102-1 to 102-n.

The transmission unit 405 transmits a result of allocation performed by the allocation unit 402 to a requesting source that requests allocation. More specifically the transmission unit 405 transmits metadata for the slice area allocated to the virtual disk VD1 to a client node 103. Timing for transmitting an allocation result by the transmission unit 405 may be when allocation by the virtual disk VD1 is completed, or when a client node 103 requests for referring to the allocation result.

More specifically for example, when a reception unit 401 receives the request for referring to the allocation result from the client node 103, metadata for the slice area allocated to a virtual disk corresponding to the client is extracted from the address table 120, and the extracted metadata is transmitted to the client node 103 as the allocation result.

Figure 5:
FIG. 5 is an explanatory diagram illustrating a specific example of an allocation result.

Now, a specific example of a result of allocation by the allocation unit 402 will be described. FIG. 5 is an explanatory diagram illustrating a specific example of the result of allocation. In FIG. 5, an allocation result 500 is a result of allocation in which a real slice area and a virtual slice area are allocated to a virtual disk VD1. More specifically, the following are sequentially allocated from the beginning as virtual disk addresses: "VD1-AD1", "VD1-AD2" ... "VD1-ADp" . . . "VD1-ADq" . . . "VD1-ADr", and so on.

The client node 103 refers to the allocation result 500, and requests access to the virtual disk VD1. More specifically, for example, when a virtual disk address "VD1-AD1" on the virtual disk VD1 is designated, first, a disk node address, "ADDR1" is identified from the allocation result 500. Then, using the identified disk node address, "ADDR1", the client node 103 accesses a disk node 102-1. The virtual disk ID "VD1" and the virtual disk address "VD1-AD1" are designated as well when reading and writing is requested.

The transmission unit 405 may transmit a notification of completion of allocating the requested storage capacity together with the allocation result. More specifically for example, the transmission unit 405 transmits a message notifying the completion of allocation of the requested storage capacity together with the allocation result 500 to the client node 103.

This enables to indicate to a user of the client node 103 that the storage area corresponding to the requested storage capacity allocated, even though physical storage area that satisfies the requested storage capacity has not actually been allocated.

Moreover, the transmission unit 405 transmits metadata to which the result of allocation by the allocation unit 402 is reflected to disk nodes 102-1 to 102-n that own the metadata. At this time, a request for changing the metadata is transmitted as well.

A specific example of a request for changing metadata transmitted to disk nodes 102-1 to 102-n will be described. FIG. 6 is an explanatory diagram illustrating a request for changing metadata. In FIG. 6, a change request 600 is a request for changing metadata "Mi-1" to "Mi-y" assigned to each slice area of the disk node 102-i.

More specifically the requests are for changing metadata Mi-1 for a real slice area "Si-1" and metadata "Mi-(x+1)" for a virtual slice area "Si-(x+1)" of the disk node 102-i indicated by shaded columns in FIG. 6. Only metadata "Mi-1" and "Mi-(x+1)" that are to be changed may be transmitted to the disk node 102-i as a request for changing.

Now, returning to the explanation of FIG. 4, a detection unit 406 detects a write request for an address that does not correspond to a slice area allocated by the allocation unit 402. More specifically for example, the detection unit 406 detects that a write request for a virtual slice area is generated when a reception unit 401 receives an error notification from a client node 103 or disk nodes 102-1 to 102-n.

The error notification is information that indicates that a write request to a virtual slice area is generated. The error notification includes information that identifies a client node 103 that is a source of access, and a virtual slice area that is a destination of the access (for example, a virtual disk ID, a disk node ID, a virtual disk address, and a disk node address). The information may allow identifying a place where a write request is directed to, that is, a virtual slice area and a virtual disk to which the virtual slice area is allocated.

If the detection unit 406 detects a write request for an address that does not correspond to a slice area, a search unit 407 searches the address table 120 for an address in slice areas that are not allocated by the allocation unit 402. More specifically an address in a real slice area with an allocation flag "OFF" is searched for.

At this time, among real slice areas of disk nodes (one of disk nodes 102-1 to 102-n) that received a write request for the virtual slice area, addresses of a real slice area with an allocation flag "OFF" may be searched for.

A change unit 408 changes an address that does not correspond to a slice area to which a write request is detected to an address searched by the search unit 407. Now, a change processing by a change unit 408 will be described by using the following example; a write request for a virtual slice area "Si-(x+1)" of a disk node 102-$i$ is detected, and as a result, an address "ADDRi-2" of a real slice area "Si-2" of a disk node 102-$i$ is found.

FIG. 7A is an explanatory diagram illustrating metadata before a change, and FIG. 7B is an explanatory diagram illustrating metadata after a change. In FIG. 7A, a reference numeral 710 is metadata "Mi-(x+1)" and "Mi-2" before a change by a change unit 408. In FIG. 7B, a reference numeral 720 is a metadata "Mi-(x+1)" and "Mi-2" after a change by the change unit 408.

More specifically when a search unit 407 searches a real slice area Si-2 of a disk node 102-$i$, "ADDRi-2", the change unit 408 changes a virtual disk ID and a virtual disk address of metadata "Mi-(x+1)" to "null", and changes a virtual disk ID and a virtual disk address of metadata "Mi-2" to "VD1" and "VD1-ADr" respectively.

Then, an allocation of a virtual slice area "Si-(x+1)" to the virtual disk VD1 is cancelled, and instead, a real slice area "Si-2" is allocated to the virtual disk VD1. As a result, the real slice area "Si-2" that has a physical storage area is allocated to the virtual disk VD1.

The transmission unit 405 transmits the result of a change made by the change unit 408 to a requesting source. More specifically for example, the transmission unit 405 transmits the changed metadata, "Mi-(x+1)" and "Mi-2" shown in FIG. 7B to the client node 103. Likewise, the transmission unit 405 transmits the changed metadata, "Mi-(x+1)" and "Mi-2" together with a change request to the disk node 102-$i$ (the node that stores the metadata to be changed).

As a result, the client node 103 refers to the changed metadata "Mi-(x+1)" and "Mi-2" and may perform a write request to a real slice area "Si-2" that has previously been performed for the virtual slice area "Si-(x+1)". More specifically the client node 103 accesses the disk node 102-$i$ using a disk node address "ADDRi" identified by the changed metadata "Mi-2". At this time, a virtual disk ID "VD1" and a virtual disk address "VD1-ADr" are designated together with a write request.

The allocation unit 402 may arbitrarily set the order of allocating a virtual slice area or a real slice area to the virtual storage disk VD1. The allocation may start from a virtual slice area or from a real slice area. However, it is desirable for the allocation order that addresses of a real slice area be allocated from the beginning and then followed by addresses of a virtual slice area.

This is because an access request to a virtual disk is designated from an address at the beginning of the order, and by allocating addresses that correspond to a virtual slice area in the latter part of the order creates a delay time until a virtual slice area is accessed. As a result, allocation to the real slice area may be delayed and thereby allocation efficiency of a storage area for an entire storage system 100 may be improved.

Now, a functional configuration of disk nodes 102-1 to 102-$n$ (hereunder, simply described as "disk node 102") will be described. FIG. 8 is a block diagram illustrating a functional configuration of a disk node. In FIG. 8, the disk node 102 includes a reception unit 801, a change unit 802, a transmission unit 803, and an execution unit 804.

Each of the functions 801 to 804 are achieved by causing a computer to execute programs for relevant functions 801 to 804 stored in a storage unit such as a ROM 302, a RAM 303, a hard disk 305, or an optical disk 307, or by an input/output I/F. Output data from each of functions 801 to 804 is stored in the above described storage unit. It is assumed that a connected function to where an arrow points in FIG. 8, reads output data from a connecting function from where an arrow starts in FIG. 8, and causes a CPU to execute a program of relevant function.

First, the reception unit 801 receives a request for changing metadata (for example, a change request 600 in FIG. 6) from the control node 101. A disk node 102 stores metadata assigned to its own real slice area and virtual slice area respectively.

A change unit 802 changes metadata stored in the node of the meta data based on a change request received by the reception unit 801. More specifically metadata may be changed, for example, by referring to a change request, and by copying (overwriting) the change request to metadata that stores the content to be changed.

The transmission unit 803 transmits a change response to the control node 101 when a change unit 802 completes metadata change. Then, the control node 101 may recognize that metadata change in the disk node 102 is completed.

The reception unit 801 receives an access request from the client node 103. More specifically the reception unit 801 receives a write and/or read request that designates a specific virtual disk ID and virtual disk address from the client node 103.

The execution unit 804 executes an access request received by the reception unit 801. More specifically, a slice ID of a slice area to be accessed is identified based on metadata managed by own node a write and/or read request designating a specific virtual disk ID and virtual disk address received by the reception unit 801.

At this point, if the identified slice area of the slice ID is a real slice area, writing and reading data to and from the real slice area is executed. If the identified slice area of the slice ID is a virtual slice area, the following processing is executed depending on a content of change for the virtual slice area.

When reading data from a virtual slice area is requested, a given value (for example, "0") is read from a storage unit such as ROM 302 or RAM 303. On the other hand, writing data to a virtual slice area is requested, an error code indicating that a storage area designated by the address does not exist is read from the storage unit.

The transmission unit 803 transmits an execution result by the execution unit 804 to the client node 103 or the control node 101. For example, the transmission unit 803 transmits a result of writing and reading to and from a real slice area and a result of reading from a virtual slice area to the client node 103.

When an error code is read, an error notification that includes the error code is transmitted to the client node 103 and/or the control node 101. The error notification includes, for example, a disk node ID of own node, a virtual disk ID of a virtual disk, and a virtual disk address.

(Various Processing Procedures of a Storage System 100)

Now, various processing procedures of a storage system 100 will be described. First, processing procedures of initializing metadata will be explained. FIG. 9 is a sequence diagram illustrating processing procedures of initializing metadata. In FIG. 9, a transmission unit 405 of a control node 101 transmits a metadata initialization request to a disk node 102 (Operation S901).

After that, a reception unit 801 of the disk node 102 receives the metadata initialization request from the control node 101 (Operation S902). Then, the execution unit 804 executes the metadata initialization processing (Operation S903). Subsequently the transmission unit 803 transmits an initialization response that indicates completion of initialization to the control node 101 (Operation S904).

Finally the reception unit 401 of the control node 101 receives the initialization response of metadata from the disk node 102 (Operation S905). As a result, metadata stored in the disk node 102 within the storage system 100 may be initialized.

Figure 10:
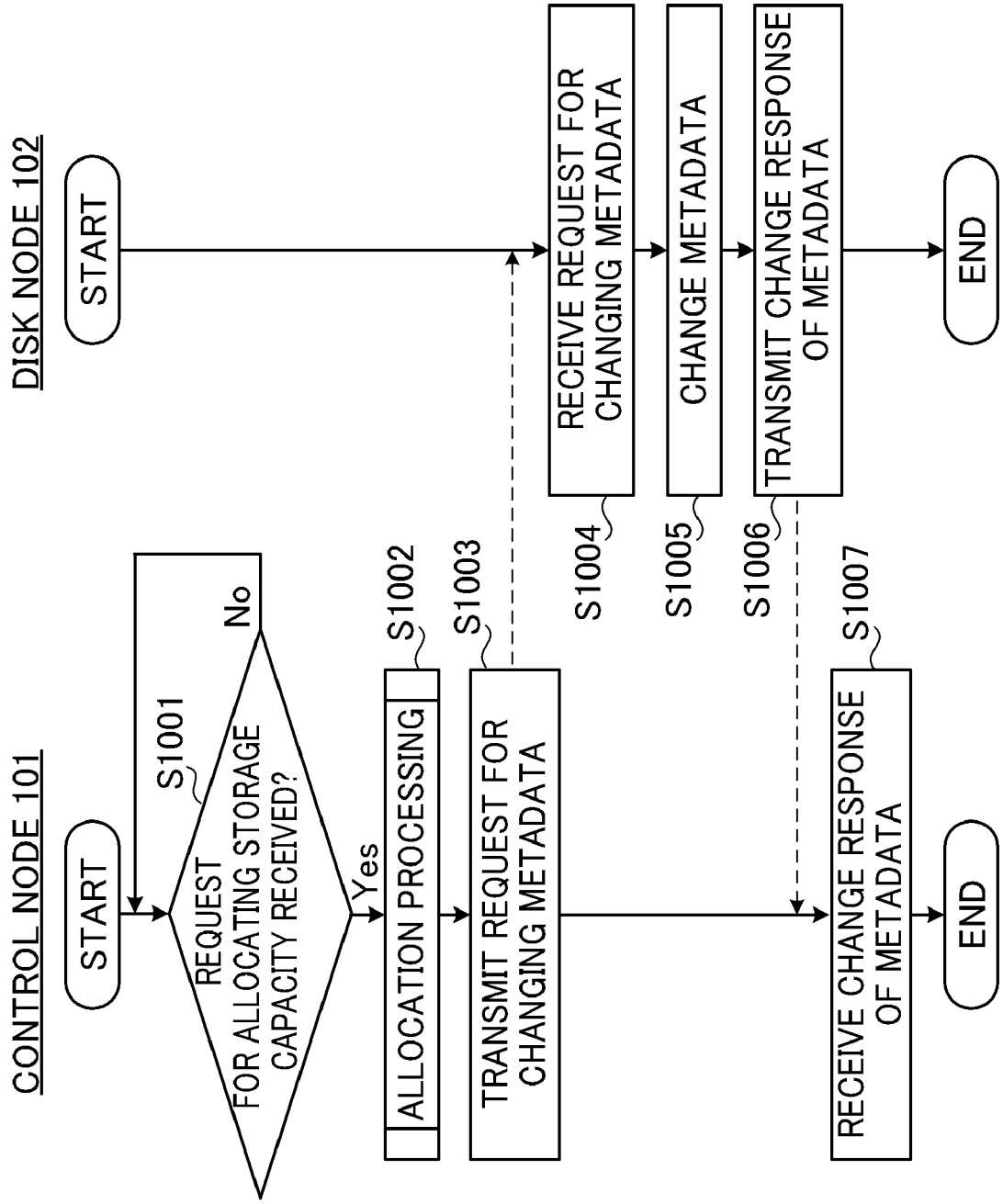
FIG. 10 is a sequence diagram illustrating processing procedures of allocating storage capacity to a virtual disk.

Now, processing procedures of allocating storage capacity to a virtual disk will be explained. FIG. 10 is a sequence diagram illustrating processing procedures of allocating storage capacity to a virtual disk. In FIG. 10, the reception unit 401 of the control node 101 judges whether or not a request for allocating storage capacity to a virtual disk has been received (Operation S1001).

After waiting for receiving a request for allocating storage capacity (Operation S1001: No), if the allocation request is received (Operation S1001: Yes), an allocation unit 402 allocates storage capacity to the virtual disk (Operation S1002). Then, a transmission unit 405 transmits a request for changing metadata to the disk node 102 (Operation S1003).

Subsequently a reception unit 801 of the disk node 102 receives a request for changing metadata from the control node 101 (Operation S1004). A change unit 802 changes the content of metadata (Operation S1005). A transmission unit 803 transmits a change response of the metadata to the control node 101 (Operation S1006).

Finally the reception unit 401 of the control node 101 receives the change response of the metadata from the disk node 102 (Operation S1007).

Figure 11:
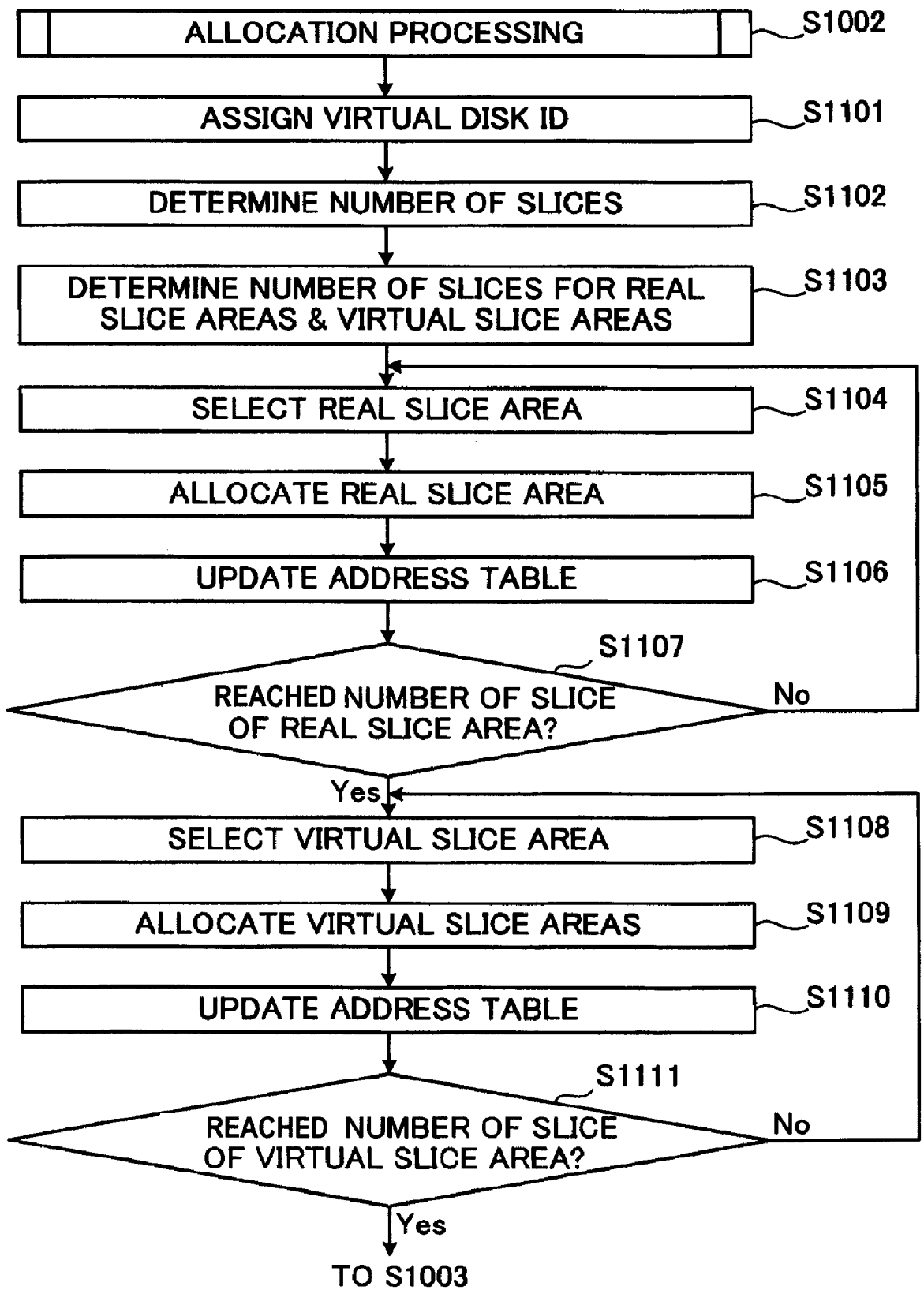
FIG. 11 is a flowchart illustrating specific processing procedures of allocation.

Next, specific processing procedures of allocation at Operation S1002 in FIG. 10 will be described. FIG. 11 is a flowchart illustrating specific processing procedures of allocation. In the flow chart of FIG. 11, first, a new virtual disk ID that corresponds to a client who requested an allocation is assigned to a virtual disk to which the requested storage capacity is to be allocated (Operation S1101).

Subsequently, a determination unit 403 determines the number of slices that comprise a virtual disk (Operation S1102), and then determines the number of slices for a virtual slice area and for a real slice area (Operation S1103). Then, a selection unit 404 refers to an address table 120 and selects a real slice area from real slice areas with an allocation flag "OFF" (Operation S1104).

An allocation unit 402 allocates an address for a real slice area selected by the selection unit 404 to a virtual disk (Operation S1105), and updates the stored content of the address table 120 (Operation S1106).

After that, it is judged whether or not the number of slices of the real slice areas allocated by the allocation unit 402 has reached the number of slices determined at Operation S1103 (Operation S1107). If it has not been reached to the number of slices (Operation S1107: No), the processing returns to Operation S1104.

If it has reached to the number (Operation S1107: Yes), the selection unit 404 refers to the address table 120, and selects a virtual slice area from virtual slice areas with an allocation flag "OFF" (Operation S1108) Then the allocation unit 402 allocates the virtual slice area selected by the selection unit 404 to the virtual disk (Operation S1109), and updates the stored content of the address table 120 (Operation S1110).

After that, it is judged whether or not the number of slices of the virtual slice areas allocated by the allocation unit 402 has reached to the number of slices determined at Operation S1103 (Operation S1111). If it has not been reached of slices (Operation S1111: No), the processing returns to Operation S1108. If it has reached the number of slices determined at Operation S1103 (Operation S1111: Yes), the processing returns to Operation S1003 shown in FIG. 10.

Now, processing procedures of an access request in the disk node 102 will be described. FIG. 12 is a flowchart illustrating processing procedures of an access request in a disk node. In the flow chart, first, the reception unit 801 judges whether or not an access request has been received from a client node 103 (Operation S1201).

After waiting for receiving an allocation request (Operation S1201: No), if the allocation request is received (Operation S1201: Yes), it is judged whether or not the access request is for reading (Operation S1202). If it is a request for reading (Operation S1202: Yes), it is judged whether or not the access destination is a real slice area (Operation S1203).

If the access destination is a real slice area (Operation S1203: Yes), an execution unit 804 reads data from the real slice area of the designated address (Operation S1204). On the other hand, if the access destination is a virtual slice area (Operation S1203: No), the execution unit 804 reads a preset value from a storage unit (Operation S1205).

At Operation S1202, if the access request is for writing (Operation S1202: No), it is judged whether or not the access destination is a real slice area (Operation S1206). If the access destination is a real slice area (Operation S1206: Yes), the execution unit 804 writes data to the real slice area of the designated address (Operation S1207).

If the access destination is a virtual slice area (Operation S1206: No), the execution unit 804 reads an error code from a storage unit (Operation S1208). Finally the transmission unit 803 transmits an access response to a client node 103 (Operation S1209), and processing of the flow chart is completed.

If an error code is read at Operation S1208, an error message that indicates that the designated address does not exist is sent to the client node 103 (and/or control node 101).

Next, change processing procedures in which a real slice area instead of a virtual slice area is allocated to a virtual disk will be explained. FIG. 13 is a flowchart illustrating change processing procedures at a control node. In the flow chart, first, a detection unit 406 judges whether or not a write request for a virtual slice area has been detected (Operation S1301).

After waiting for detecting a request for writing to a virtual slice area (Operation S1301: No), if the request is detected (Operation S1301: Yes), a search unit 407 searches for an address with an allocation flag "OFF" in a real slice area (Operation S1302). Then, a change unit 408 changes an address of a virtual slice area to which a write request has been detected to the address located by the search unit 407 (Operation S1303).

Then, the change unit 408 updates a stored content of the address table 120 based on the result of the change by the change unit 408 (Operation S1304). Finally the transmission unit 405 transmits the result of the change by the change unit 408 to the client node 103 (Operation S1305), and processing of the flow chart is completed.

Note that, at Operation S1305, the change result may be transmitted to the disk node 102 where metadata of the changed virtual slice area and real slice area are stored.

In Operation S1302, if an address of a real slice area with an allocation flag "OFF" is not found, a message that indicates that a disk node 102 (disk device) needs to be added may be submitted to a manager of the storage system 100.

As explained above, according to an embodiment of the present disclosure, the control node 101 may collectively control the allocation status of storage capacity of the entire storage system 100 to a virtual disk. This achieves optimum allocation of storage capacity for the entire storage system 100.

Treating the storage capacity for the entire storage system 100 as a disk pool, the single disk pool may be extended by simply adding a new disk node. Moreover, a virtual slice area that does not have any physical storage area may be allocated to a virtual disk. This enables allocation of storage capacity that exceeds the storage capacity for the entire storage system 100.

Furthermore, when a request for writing to a virtual slice area is generated, a real slice area that has a physical storage area may be allocated instead of the virtual slice area to a virtual disk. As a result, a write request from the client may be appropriately processed.

Virtual slice areas and real slice areas that are allocated to a virtual disk may be evenly distributed among a plurality of disk nodes 102-1 to 102-*n*. Thus, access requests to the virtual slice areas and the real slice areas may be evenly distributed among the plurality of disk nodes 102-1 to 102-*n*.

As explained the above, according to this allocation control program, allocation control apparatus, and allocation control method, efficient and effective storage capacity allocation may be achieved by collectively controlling the allocation status of the storage capacity of the entire storage system 100.

The methods for controlling allocation explained in this embodiment can be achieved by causing a computer such as a personal computer and a workstation to execute a prepared program. Such program is stored in a computer-readable storage medium such as a hard disk, a flexible disk, a compact disc ROM (CD-ROM), a magneto-optical (MO) disk, and a digital versatile disk (DVD), and read and executed by a computer. The program may be transmission medium distributable through a network such as the Internet.

All examples and conditional language recited herein are intended for pedagogical purpose to aid the reader in understanding the principles of the invention and the concepts contributed by the inventor to furthering the art, and are to be construed as being without limitation to such specifically recited examples and conditions, nor does the organization of such examples in the specification related to a showing of the superiority and inferiority of the invention. Although the embodiment(s) of the present invention has been described in detail, it should be understood that the various changes, substitutions, and alterations could be made hereto without departing from the spirit and scope of the invention.

What is claimed is:

1. A storage capacity allocation control apparatus that accesses an address table storing real addresses of real slice areas in a storage area for an entire storage system having a plurality of storage devices and addresses that do not correspond to the real slice areas, the storage capacity allocation control apparatus comprising:
   a reception unit receiving a request for allocating a storage capacity;
   an allocation unit allocating, by referring to said address table, virtual addresses that do not correspond to said real slice to at least a part of the requested storage capacity, so that the number of virtual slice areas that correspond to said virtual addresses are equal in each of said storage devices, and allocating at least one of said real addresses to remaining requested storage capacity, when said reception unit receives said allocation request; and
   a transmission unit transmitting a result allocated by said allocation unit to a requesting source of said allocation request.

2. A storage capacity allocation control method executed by a computer; comprising:
   receiving a request for allocating an arbitrary storage capacity;
   allocating, by referring to an address table storing real addresses of real slice areas in a storage area of an entire storage system having a plurality of storage devices, virtual addresses that do not correspond to said slice areas for at least a part of the requested storage capacity, so that the number of virtual slice areas that correspond to said virtual addresses are equal in each of said storage devices, and allocating at least one of said real addresses to the remaining requested storage capacity when receiving said allocation request; and
   transmitting an allocation result to a requesting source of said allocation request.

3. A computer-readable, non-transitory medium storing an allocation control program, in a computer program, that accesses an address table storing real addresses of real slice areas in storage areas of an entire storage system having a plurality of storage devices and virtual addresses that do not correspond to the real slice areas, causing said computer to function as:
   a reception unit receiving a request for allocating a storage capacity;
   an allocation unit allocating, by referring to said address table, virtual addresses that do not correspond to said real slice areas to at least part of the requested storage capacity, so that the number of virtual slice areas that correspond to said virtual addresses are equal in each of said storage devices, and allocating at least one of said real addresses to the remaining requested storage capacity, when said reception unit receives said allocation request; and
   a transmission unit transmitting a result allocated by said allocation unit to a requesting source of said allocation request.

4. The computer-readable, non-transitory medium storing an allocation control program according to claim 3, wherein said transmission unit further transmits a notification of completion of allocating said requested storage capacity to said requesting source.

5. The computer-readable, non-transitory medium storing an allocation control program according to claim 3, further causing said computer to function as:
   a detection unit detecting a request for writing to the virtual addresses that do not correspond to said real slice area allocated by said allocation unit;
   a search unit searching said address table for real addresses of said real slice areas that has not been allocated by said allocation unit when said detection unit detects said request for writing to the virtual addresses that do not correspond to said allocated real slice areas; and
   a change unit changing said virtual addresses that do not correspond to said real slice areas to which said request for writing is detected to said real addresses located by said search unit; and
   said transmission unit transmits the result of change made by said change unit to said requesting source.

6. The computer-readable, non-transitory medium storing an allocation control program according to claim 3, wherein the number of real addresses of said real slice areas, which were allocated to said virtual addresses that do not correspond to said real slice area, in said each of said storage devices are equal.

\* \* \* \* \*